United States Patent
Kobza et al.

(10) Patent No.: US 7,548,930 B2
(45) Date of Patent: Jun. 16, 2009

(54) PLATFORM FOR MANAGEMENT OF INTERNET BASED PUBLIC COMMUNICATIONS AND PUBLIC COMMENT

(75) Inventors: Kim Patrick Kobza, Naples, FL (US); David A. Bankston, Naples, FL (US)

(73) Assignee: Neighborhood America, Naples, FL (US)

( * ) Notice: Subject to any disclaimer, the term of this patent is extended or adjusted under 35 U.S.C. 154(b) by 289 days.

(21) Appl. No.: 10/690,344

(22) Filed: Oct. 20, 2003

(65) Prior Publication Data

US 2005/0240623 A1    Oct. 27, 2005

Related U.S. Application Data

(60) Provisional application No. 60/474,740, filed on May 30, 2003, provisional application No. 60/466,769, filed on Apr. 30, 2003, provisional application No. 60/451,082, filed on Feb. 28, 2003, provisional application No. 60/419,645, filed on Oct. 18, 2002.

(51) Int. Cl.
*G06F 17/30* (2006.01)
(52) U.S. Cl. ............................. 707/102; 707/9; 707/3; 707/10; 707/200
(58) Field of Classification Search ............ 707/9, 707/10; 709/206; 705/9
See application file for complete search history.

(56) References Cited

U.S. PATENT DOCUMENTS 5,446,895 A * 8/1995 White et al. ............... 717/101
7,124,164 B1 * 10/2006 Chemtob .................... 709/204
2001/0025250 A1   9/2001 Gale et al.
2001/0044768 A1  11/2001 Wares
2002/0035535 A1   3/2002 Brock
2002/0049624 A1   4/2002 Raveis
2002/0065739 A1   5/2002 Florance et al.
2003/0023610 A1   1/2003 Bove et al.
2003/0101089 A1 * 5/2003 Chappel et al. ............. 705/10
2003/0106039 A1 * 6/2003 Rosnow et al. ............. 717/100
2003/0135565 A1 * 7/2003 Estrada ...................... 709/206
2004/0002887 A1 * 1/2004 Fliess et al. .................. 705/9
2004/0015367 A1 * 1/2004 Nicastro et al. .............. 705/1
2004/0083157 A1   4/2004 Sasser
2005/0010640 A1 * 1/2005 Cannata et al. ............ 709/205
2005/0038687 A1 * 2/2005 Galdes ........................ 705/9

* cited by examiner

*Primary Examiner*—Cam Y T Truong
(74) *Attorney, Agent, or Firm*—Michele V. Frank; Patton Boggs LLP (57) ABSTRACT

An Internet-based integrated technology platform that simultaneously supports the management of Public Information Sites—Web sites used to both (1) inform the public; and (2) capture and manage public comment (including submission of images)—while at the same time providing support for electronic communication for project teams that manage public involvement projects. The support includes sharing of graphic, text and collaborative tasks. The system and method allow revisions to comments and dynamic feedback in agency decision making based on comments with greater responsiveness. The system is also suited for implementing charettes with a large number of participants.

29 Claims, 8 Drawing Sheets

PLATFORM FOR MANAGEMENT OF INTERNET BASED PUBLIC COMMUNICATIONS AND PUBLIC COMMENT

REFERENCE TO RELATED APPLICATIONS

This application claims priority from the U.S. Provisional Patent Application Nos. 60/419,645 filed on Oct. 18, 2002, 60/474,740 filed on May 30, 2003, 60/451,082 filed on Feb. 28, 2003, and 60/466,769 filed on Apr. 30, 2003, all of which are incorporated herein in their entirety.

FIELD OF THE INVENTION

The present invention relates in general to providing an integrated technology platform for management of public information sites, which inform the public and capture and manage public comment while providing support for backend project management.

BACKGROUND OF THE INVENTION

Traditional Internet-based communications with the public at large are in the context of providing information (often coupled with advertising content) as in online newspaper associated portals, government sites, and the like. When backend operations interact with users, e.g., customer relation management software, they typically provide a point-to-point model in which a single customer communicates with only one service representative to resolve an issue. Issues raised by customers are often resolved one at a time and in complete isolation from other issues.

These characteristics of the known, or merely theoretically possible, solutions for interaction with the public-at-large make them slow and unsuitable for projects requiring interactions with a large number of participants, who necessarily have more limited roles in the overall project. Examples of such projects are found in the promulgation of regulations by government, whether local, state, or federal. There are about eighty thousand (80,000) agencies in the United States alone that promulgate regulations on myriad topics. Typically, such promulgations are required to conform to the notice and/or comment requirements in various Administrative Procedure Acts or their equivalent controlling legislation. Such legislative provisions typically require that notice of a proposed and adopted regulation be provided to the public. This is traditionally accomplished by publishing the rule in a gazette. In addition, the public may comment on a proposed rule to aid an agency in arriving at the final rule. It is estimated that there are upwards of one hundred and twenty thousand (120,000) agencies worldwide that are subject to a variety of procedures for soliciting and acting on public input.

The realization of the Internet and its use to provide information, e.g., tax statutes, regulations, forms and publications by the Internal Revenue Service, is clearly of great use in helping various agencies fulfill their assigned calling more effectively. However, merely providing a Web portal and an electronic mail address is insufficient for optimal participation by the public in rule making as envisaged and provided for in various legislative and other provisions. Internet usage is likely to grow with the lowered transaction costs for communicating via the Internet increasing the fraction of public-at-large receiving information via the Internet.

Such public participation may be in the form of surveys to gauge sentiment, debates on possible land use policy, feedback on proposed rules, opinions on developing a particular area, exchanging information for law enforcement purpose, and the like. Government may be made more responsive and efficient by the increased use of the Internet to not just lower transaction costs but to allow a different and new ways of administering.

Existing solutions comprise little more than providing a web portal and, optionally, email addresses. Effectively managing a large number of emails and other electronic inputs will increasingly stress the existing systems resulting in an overall increase in the cost of government. Moreover, receiving various submissions in multiple formats may result in both intra-system incompatibility and even make some of the information inaccessible overtime with no systematic method for upgrading or otherwise managing the submissions.

Current implementations also result in isolation of issues, which results in a failure to utilize experiences obtained through solving one issue in solving other issues. Furthermore, little collaboration between various agencies and representatives within an agency exists since they usually work on isolated issues. It is quite possible that relevant experience of various agencies and the staff within them is not apparent to their supervisors as well, thereby further reducing the cost-effectiveness of the point-to-point model compared to the investment required for creating and maintaining a web portal and electronic access.

Another problem associated with traditional systems is that it is difficult for members of the public-at-large to gather needed information related to their requests. Most people typically organize their needs in some form of a project structure. It is therefore nearly impossible for these customers to obtain a complete picture of all the needed information at a project level Yet another problem associated with the point-to-point model is accessibility. The point-to-point models are limited to phone conversations and emails with the occasional online tracking service for customer requests. New technologies that we now use all the time (e.g. PDAs, Instant Messaging services) have not been integrated into these models. Moreover, information related to a request is usually kept in different formats such as word documents, powerpoint slides, emails, source code, etc. This makes it very difficult to access this information from different devices such as cell phones and PDAs.

Another challenge is in providing support for an online charetter effort. A 'Charette' is an intense effort to solve a problem, typically architectural, within a limited time. Consequently, intense cooperation within a team and various sub-teams is required to make the effort fruitful. It is not possible to implement such an effort with a large number of participating individuals due to the logistical and organizational challenges that are inevitably present with large numbers.

SUMMARY OF THE INVENTION

The present invention overcomes these drawbacks and provides an integrated technology platform that supports both (i) Public information Web site(s) for informing the public; and (ii) capturing and managing public comment in an electronically secure environment. This enables efficient utilization of public participation by project teams that manage public involvement projects.

As a result of the efficient integration of various components in a systematic manner to facilitate collaboration, the present invention speeds up decision making and reduces the cost in public involvement projects. The preferred embodiments of the invention employ simultaneous communications management architecture. In a preferred embodiment of the invention, a communication manager unifies the project team online substantially in real time.

In a preferred embodiment of the invention, communications manager comprises shared code that is reused in several different contexts. The code is modular to facilitate reusablity and employs a database designed to ensure consistency and avoid unnecessary data redundancy. Communications manager handles and redirects to different code to accommodate different browsers used by different users. In addition, various levels of permissions provide security. Communications manager can also provide Web site maintenance support, for instance, by updates to the dynamic text areas, creation of Web sites with the use of templates, integrated handling of different Web sites with customizations handled to distinguish each site when desired, and providing a separate web address for submission of public comments while remaining integrated with the public Web site, automatic font and color control, and supporting substantially unlimited number of active pages.

The present invention allows publication, preferably immediately or on an ongoing basis, of project work-product to enable a concurrent public feedback loop to create a desired level of transparency. The back-end integration allows enterprises, and public agencies to manage their public comments, including optionally limiting to comments from a more selected audience, across many projects at the same time while, preferably, supporting multiple, possibly distinct, teams of consultants, agency staff, stakeholder organizations, officials with electronic project management, work-flow, document and image management, content management, Web-site management, and full reporting technologies.

The system and methods of the present invention are suitable for various public, quasi-public, and private organizations projects such as transportation planning, regional, comprehensive and master planning, utilities, environmental projects, parks and recreation, Brownfield projects, and intra-agency communication. The user interfaces are preferably browser based with thin client technology to allow management of project information from a large number of locations by requiring little more than access to a browser and the Web.

The present invention is also well suited to facilitate compliance with a wide variety protocols for public comments, such as federal, state and local governments. For instance, in an embodiment of the invention no anonymous comments may be posted, and allows screening of public comments for propriety prior to publishing. An objectionable comment that escapes the screening may be dynamically removed from the Web site.

In addition to receiving public comments, the present invention also facilitates moderated public discussions compliant with predetermined public comment standards. Preferably in an embodiment of the invention, documents may be published to both internal project team and an external Web site. Similarly, images may be published to both the internal project team and the Web site. The present invention integrates project management with the ability to publish, prepare reports based on or categorize public comments along with the ability to create, report and publish surveys.

A preferred embodiment of the present invention is the Internet-based Public Communication Management™ System provided by Neighborhood America, Inc., of Naples, Fla. This system provides a front end to provide information to and handle a large number of inputs from the public-at-large while providing a backend that is suitable for one or more projects that may use and respond to the input from the public-at-large. Such projects may include back-ends providing multiple levels of access to various employees and team members and allow for collaboration. The backend integration is suitable for handling materials for uploading to one or more websites and for receiving, characterizing, filtering, analyzing of input from the public-at-large to facilitate responses thereto. In the preferred embodiment of the invention, the submissions are treated as a matter of record with the same force as if each submitter actually appeared personally to provide input. To this end, each electronic participant is authenticated and provided with a single point of entry to control multiple submissions.

This facilitation of public comments not only reduces the cost of making such submissions, it also allows less active stakeholders to stay involved. The ability to generate reports integrating various comments, analysis and surveys provides robust visualization, graphics, maps and the like. However, this solicitation and management of public comments remains open and neutral to allow diverse viewpoints to be presented and considered.

Another aspect of the present invention enables customizable software interfaces to a discussion forum for members involved in a common project. In addition, submissions from the public-at-large may be posted or even responded to by other individuals. Such postings may be made in response to a release permitting identifying information to be displayed. In addition, the submissions from the public-at-large conform to the requirements of various legislations controlling participation by individuals in requiring that each contributor be authenticated.

Yet another aspect of the present invention comprises integration of various searching abilities to facilitate responding to and categorizing submissions to ensure improved responsiveness by the agency or the entity handling comments. For instance, in a preferred embodiment, submissions and documents may be searched by keyword, submitter's identifier, an idea, a theme, a vision (preferably associated with a theme), a location. The results of a search may be organized such as chronologically, alphabetically, hierarchically and the like.

The surveys made possible by the present invention are preferably integrated as well. A preferred embodiment of the invention includes creating surveys, presenting surveys, for instance, dynamic presentation in which the next question depends on a prior response, prescreening survey participants, generating reports based on surveys including dynamically generating such reports. Surveys may also be presented as form(s) that may be filled by the respondents. Active forms automatically screen inputs for consistency with the various field definitions/requirements as well as, preferably, overall consistency.

While many images may also be considered to be documents, a preferred embodiment of the invention includes an image management tool. The tool preferably provide the ability to delete or sequester inappropriate submissions, view and edit descriptions, group images, and manipulate the submitter's name, address and other information including permissions associated with the submission.

A preferred embodiment of the invention is also suitable for charette reporting and management. Charette submissions are preferably categorized by workshop and subcategorized by ideas. The rapid response possible with the present invention is well suited for the time limited intense nature of charettes.

In a preferred embodiment, the system includes a Communications Manager, which provides multiple levels of user permissions such as a User Manager, the highest level having full administrative privileges across the enterprise system, who can add and assign users to projects; a Project Manager, who can create new projects and fully manage all modules within Communications Manager; and a Team Member, who can view certain modules within the system, having read-only access to such modules unless they are assigned to a User group having Read/Update Permissions. User Groups, preferably, contain groups of team members. User groups are assigned to certain items such as Documents or Images with the ability to perform certain functions to the item that their user group was granted permission to. User group permissions are preferably a project level setting. If not enabled, Team Members will have read only access to all items within the project.

In another aspect, the present invention provides support for charettes, including when a large number of individuals, even strangers, come together to explore and consider a wider variety of design choices or solutions in short period of time. This is possible due to the integration of various levels of access with management of submissions resulting in rapid categorization and analysis of the submissions. The interactivity made possible by the invention allows cooperative interactions while reducing the impact of potentially disruptive or non-productive submissions.

DETAILED DESCRIPTION OF THE INVENTION

The present invention includes a Web-based, authentication requiring communications platform that enables easy, confidential, and seamless connection to ideas, documents and project information. It utilizes the advantages and efficiencies of the Internet by using an integrated platform that is accessible to users everywhere around the world through the Internet. In addition, preferred embodiments of the present invention include facilities for receiving, analyzing, and using comments or input from targeted or untargeted individuals or groups.

It is expected that by 2007, many, possibly all, cities and counties in the United States will utilize a system for managing electronic communications with the public. Preferably, this includes a Web-based, password protected communication platform with facilities for receiving, analyzing, and using public comments in the course of rule making. Such a system will make the government more transparent and responsive by reducing the transaction costs for such interactions to a level sufficient for increased public participation.

The present invention comprises a Web site which enables multiple users to log in securely, access a common group of documents which are centrally located on the server computer, post and assign tasks to other users, automatically send e-mails to members of the team notifying them of certain events, and send each other instant messages over the Internet. An account is created for each team member which contains information concerning that team member and tracks the tasks and progress of that member. The result is the unification of the entire project team by allowing them to collaborate with one another online and in real time. Efficient communication and coordination that is critical to the success of the project team is made possible through this invention.

Figure 1:
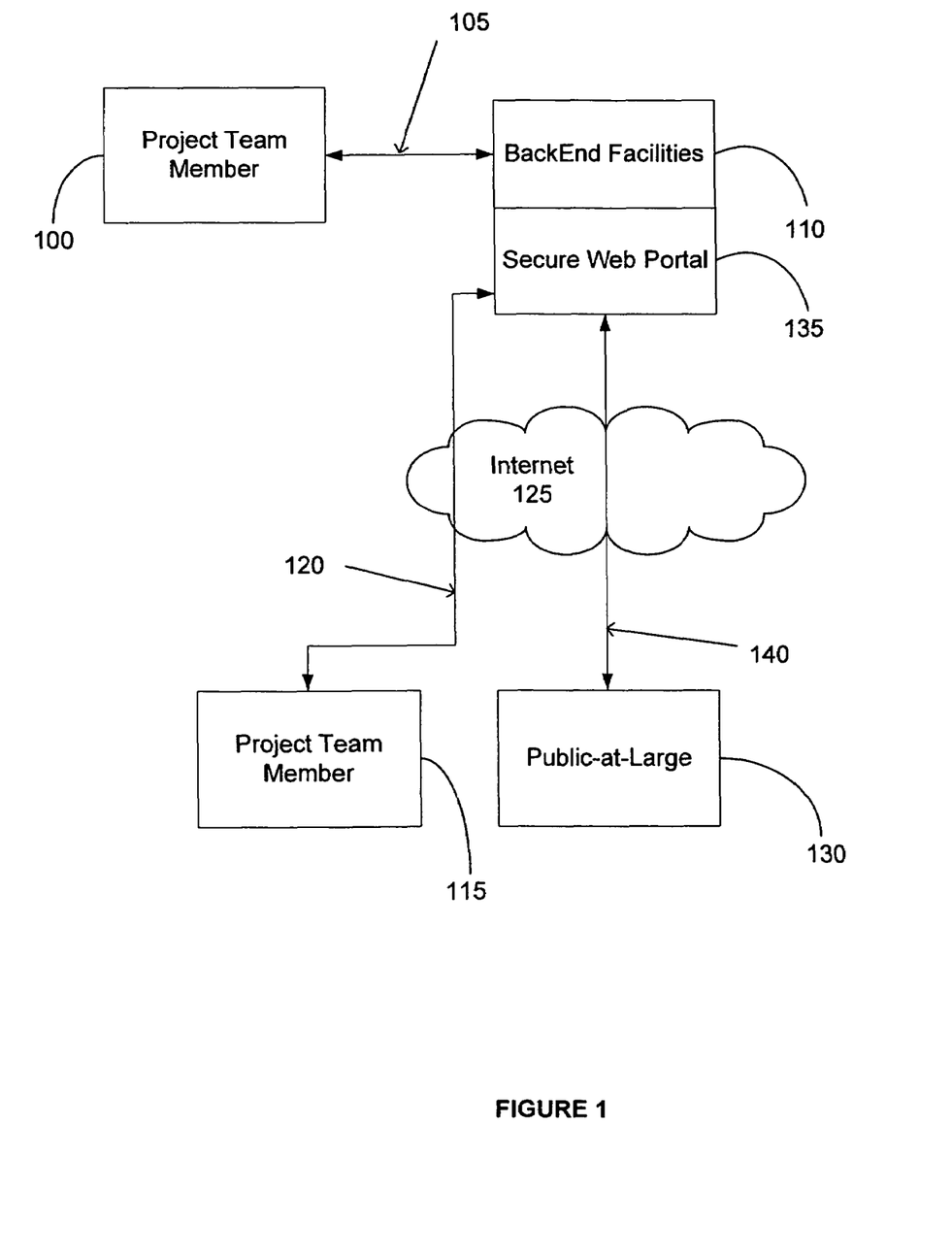
FIG. 1 schematically depicts the interactions between the public and members of a project team in a preferred embodiment.

FIG. 1 provides an illustrative depiction of an embodiment of the invention. Project team member 100 communicates via a direct link 105 with a server 110 supporting backend functionality for integrating various services and communications. Such interaction enables the project members to interact with each other in a fluid and transparent manner. Preferably, use of secure authentication to control access to the backend allows even distant project team member 115 to communicate with server 110 by using link 120 via Internet 125. Preferably following authentication (to ensure a single point of access), public user 130 uses Internet 125 to access Web site 135 to obtain information provided by the project team, participate in discussions, submit opinions and comments.

The present invention comprises a communications manager collection of software programs which function together to facilitate efficient communications between members of a project team and organize all aspects of the project. Tasks performed by the communications manager performs are preferably available through the browser interface to implement the preferred thin client design.

Figure 3:
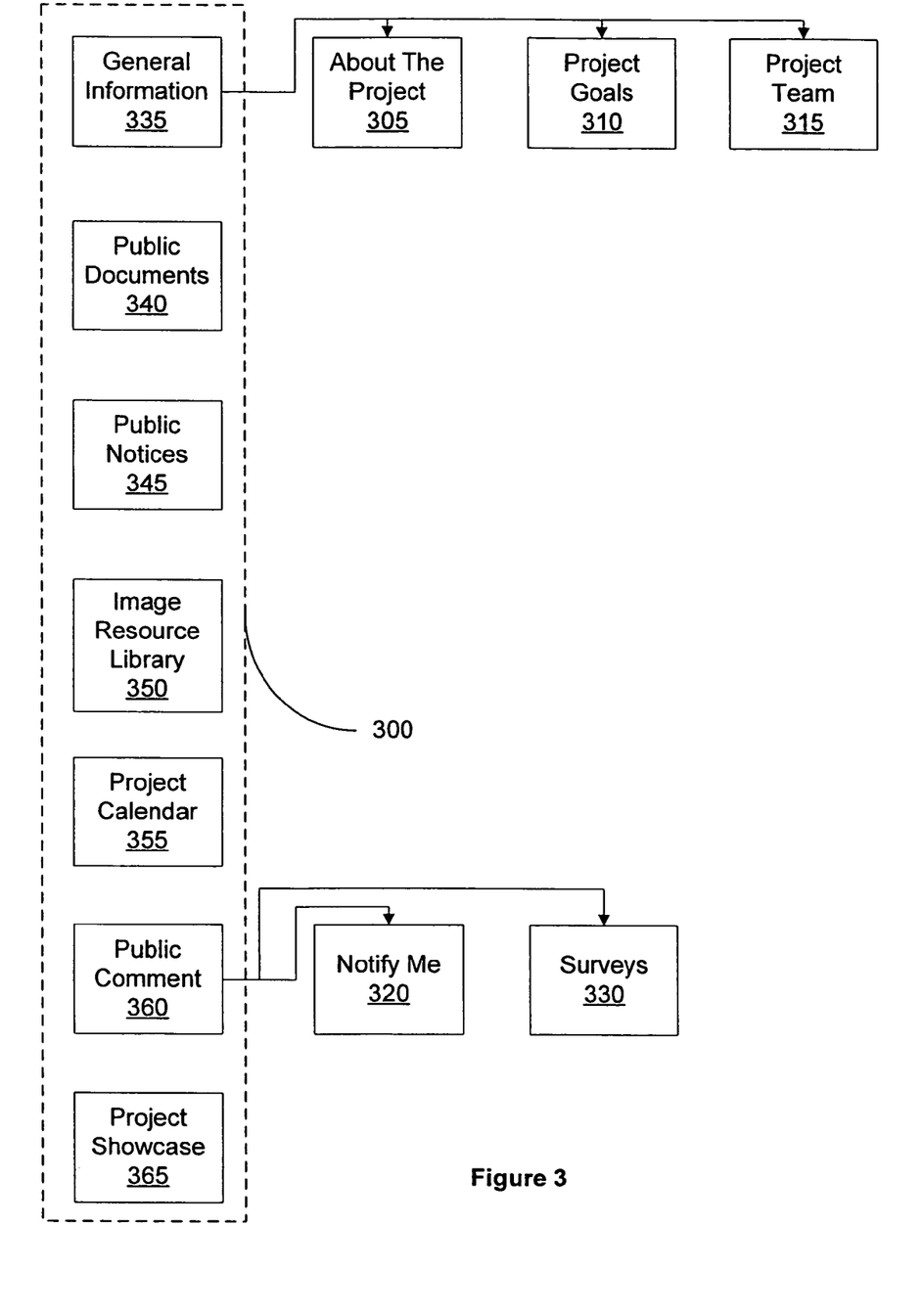
FIG. 3 schematically depicts an interface presented to a member of the public at a Web site.

FIG. 3 schematically depicts user interface 300 presented to a user in a preferred embodiment of the invention. User interface 300 includes a number of links to obtain information or provide comments. In addition, some of the elements in user interface 300 of FIG. 3 may not be presented to all users. User Interface 300 includes a link or menu general information 335, which leads to three links titled "About the Project," Project Goals," and "Project Team." Also presented on user interface 300 are public documents 340, Public Notices 345, a link or menu Image Resource Library 350, Project Calendar 355, link or menu Public Comment 360 leading to Surveys 330 for gauging opinions and feedback, and a permission request for sending a notification or updates, Notify Me 320, and Project Showcase 365.

Figure 2:
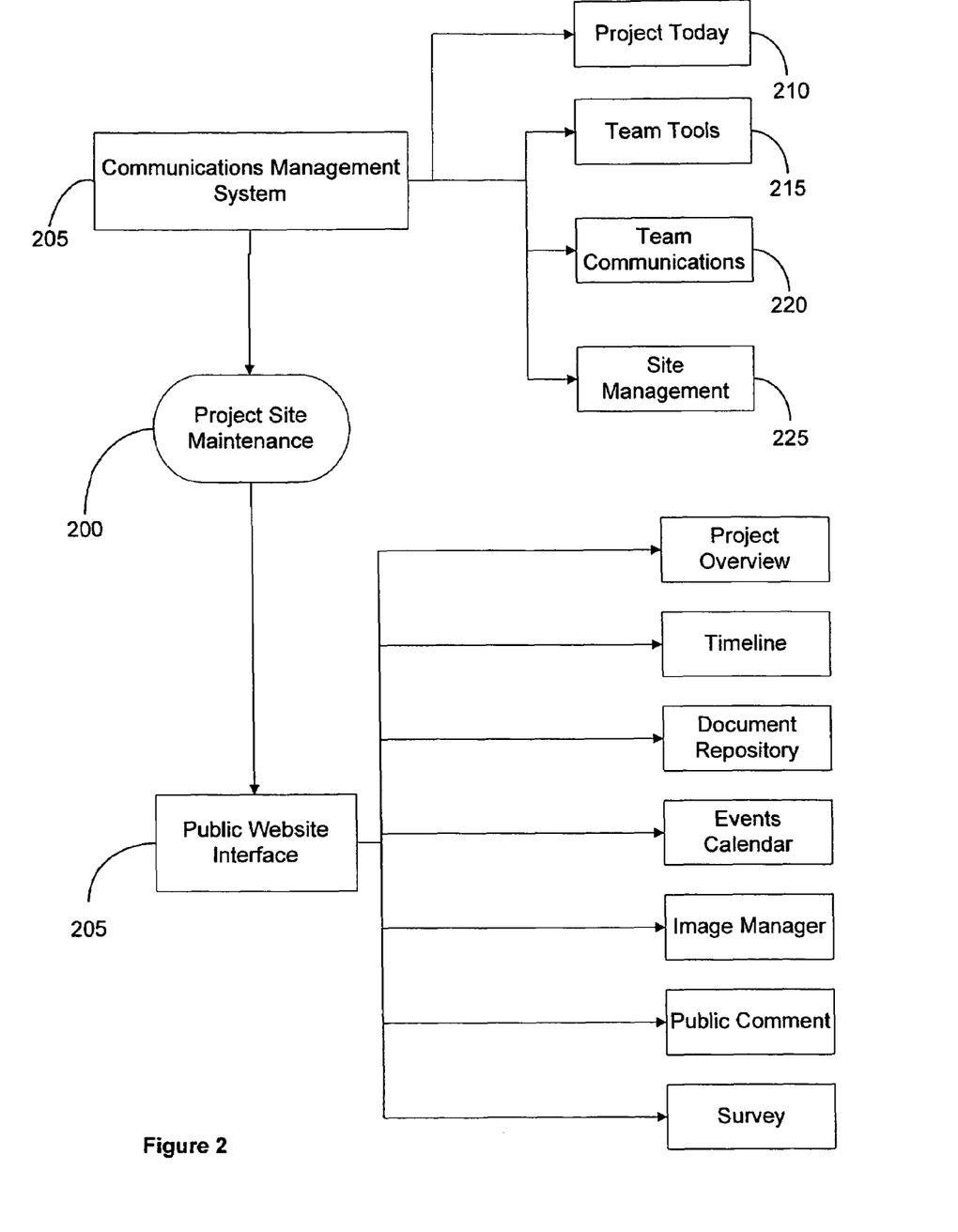
FIG. 2 schematically depicts a layout of various back-end and front-end functionalities in a preferred embodiment.

FIG. 2 provides an illustrative embodiment of the invention that comprises software for managing projects 200 that can access various modules via a communications management module 205, which includes information module 210, team tools module 215, team communication tools module 220, and site management tools 225.

Figure 5:
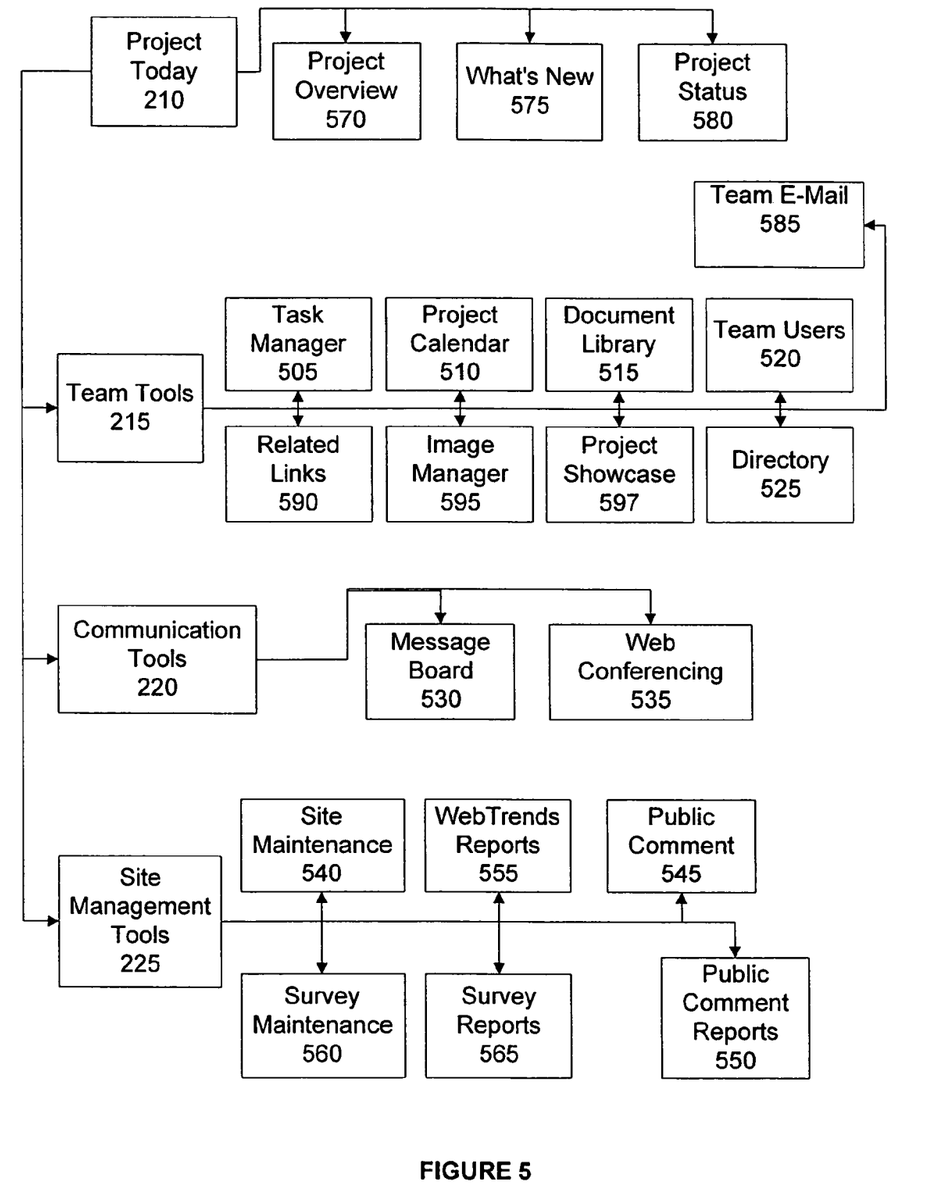
FIG. 5 schematically depicts further details in an embodiment of the Communication Management System of FIG. 1.

FIG. 5 provides an illustrative embodiment of team tools module suitable for operation with the embodiment shown in FIG. 2. In FIG. 5, team tools module 215 includes managing tasks 505, maintaining a project calendar 510, maintaining a document library 515, maintaining user profiles 520 with user e-mail addresses in a team directory 525.

FIG. 5 shows illustrative team communications tools module 220, which includes maintaining a message board 530 with web conferencing capabilities 535.

FIG. 5 also shows illustrative site management tools module 225, which includes maintaining a web site 540 with capability to solicit public opinion 545 and generate reports 550. Illustrative site management tools module 225 further includes generating Webtrends reports 555, survey maintenance 560, and generating survey reports 565.

The communications manager, as the central component of the technology platform, preferably provides a plurality of features such as secure communications to define TeamSpaces—where you get work done; predefined TeamSpace templates to speed deployment; custom company Branded Portal—e.g.; http://company.commmgr.com to allow easy adaptation of the software for different entities; Image Management System to manage and distribute Digital Media files; Enterprise Project TeamSpace Manager to rapidly create new workspaces; calendaring to synchronize data with MS Outlook 2000® and/or other software packages of interest; Task Management System for importing or exporting data into a Project; Survey Manager to quickly create surveys; document management system; a personal customizable start page for team members that includes support for accessing or participating in multiple projects; a global calendar to integrate calendar events for many projects into one calendar; a User Manager to control access rights; a Contact Manager to synchronize contact data with MS Outlook/PDA's and other devices or software of interest; Site Content Manager for quick and dynamic updating of website content; Web Conferencing support, e.g., provided by Integrated WebEx®; CAD Document Manager for effective use of graphical design documents such as Redline CAD or Plotter format documents; facilitate discussions with threaded discussions, preferably, with email notification; Web Based Quick Email to send email to project team members via distribution lists; and a wireless communications manager 4, preferably suitable for substantially real-time support, e.g., via Pocket PC, Tablet and Windows CE devices.

The communications management system preferably has shared code to facilitate rapid development with lower development and support costs. In a preferred embodiment there are about 5000 files of ASP (Active server pages) code divided in over 300 directories. In this preferred embodiment, the ASP code is modularized using functions and subroutines for reusability and easy maintainability. This embodiment further can handle over 2500 images to make it readily customizable for variety of purposes. This flexible architecture allows substantially the same set of core code to manage a very large and potentially unlimited number of projects.

The preferred embodiment uses RDBMS Microsoft SQL server to store and maintain all its data persistent needs with the help of features such as "Stored Procedures," "User Defined Functions" and indexes for improved performance. In the preferred embodiment, all data is stored across 200 Relational Tables with the tables interrelated to maintain the data consistency and avoid unnecessary data redundancy. The communication management system of the preferred embodiment handles browser compatibility issues, for instance, by redirecting to a different code depending on the particular browser employed by the user. The preferred communication management system interacts with many third party components to utilize the industry standard functionalities such as uploading files and redrawing images.

To ensure adequate security, the system preferably employs multiple access levels so that users can see different information depending on their access level and consistent with their read/write permissions.

With the ability to generate new projects with branding through an automated system, the preferred communications management system can support public Web site maintenance by using its feature for dynamically updating the dynamic text areas. This is typically the publicly viewed information retrieved directly from the database when the page is loaded. Preferably, each site is in a different directory. By supporting dynamic updating unless customization requires otherwise, provides significantly improved flexibility in deployment.

Preferably, public comments are directed to a separate Web address. In addition, although designed to handle comments from public at large, it is possible to create additional communications manager systems for just project management Preferably, a start page may be customized for an individual's particular involvement with multiple projects. This may include viewing calendar events across all projects; detailed view of multiple clients, divisions and projects; Customer Service contacts; and downloading of Viewer plug-ins.

FIG. 5 provides a schematic of Project Today 210 functionality area of the communications management system, which welcomes the user to the project area and references their permission level access. This area also enables the project manager(s) to keep team members updated on a daily basis through dynamic text areas. Project Today 210 area preferably includes an introduction to the overall project goals via project overview 570; updates team members on breaking news about the project to call their attention to pertinent project related issues via What's New 575; and Project Status 580 to provide a quick overview of overall project status Team Tools functionality 215, as depicted in the embodiment of FIG. 5, comprises project management tools accessible to project team members. These areas preferably have grouped access control. Some examples of such tools include Team Task Manager 505 for task tracking information and features such as (1) the ability to categorize tasks in groups and subgroups; (2) the ability to add subtasks; (3) "Assign" to notification; (4) "Task Complete" notification; (5) the ability to add notes to tasks; (6) enhanced sorting capabilities include sorting by Task Number, Due Date, Priority, Category, Status or Assigned To; (7) the ability to assign priority to tasks; and (8) updating Outlook.

Team Tools functionality 215 also includes Project Calendar 510, which adds personal and project events; provides a view of Daily/Monthly/Yearly events; provides linked URL; updates personal Outlook calendar. Team Tools functionality 215 may also include Document Library 515 to represent Document libraries available within one project; implement Group/subgroups and control order of listed documents; allow a plurality of types of Document Views, for instance Folder and List views with toggling; a History log; substantially unlimited upload space; document download capability; improved user friendly screens; uploading multiple format types except specified formats such as .exe; a viewer, e.g., Brava viewer, for CAD redlining; a documents check in/out feature; and a search capability through uploaded document titles and descriptions.

Team Tools functionality 215 also includes Team Users 520, which allows an assigned project team member rights for managing team member login information including that for initiating new team members; and controlling user access levels by performing as User Manager site maintenance and creating new users. This may be the highest level access. A team member preferably has Read Only for most areas. A Project Manager's Web site maintenance related access privileges are more extensive than those of a team member, while a SuperUser may have unlimited access to all projects.

Team Users 520 preferably includes assigning team users to various groups, allowing a user add his contacts to Microsoft outlook, and assigning users to projects owned by multiple clients. Clients may create group names for other contracted partners as sub-clients. The User list can be sorted by Username, First Name, Last Name, Client or access level for each member on the list.

Team Tools functionality 215 also includes Team E-mail 585 to allow Team members to e-mail all participants individually, in groups or all at once. Team Tools functionality 215 further includes Related Links 590 for storing referenced links preferably complete with title and site description, and with desired grouping.

Image Manager 595 in Team Tools functionality 215 supports uploading of images having .jpg, .tif and .eps image formats with, preferably, automatic creation of image thumbnails, customized keyword searching, such as by entering search words individually or in groups separated by commas; rotating images, for instance by 90, 180, or 270 degrees; providing thumbnail, List or Slide views; grouping of images for preferred organization; assigning different images to different security groups, and with an optional detailed Title and Description, sequence numbers, with the option to Scale to browser window.

As shown in FIG. 5, Communication Tools 220, preferably, comprise a Message Board 530 and Web conferencing 535. These allow complete threaded message board for the project team communication with online interactive discussions of topics, including those added dynamically. Such discussions may be initiated by team members with facility for archiving discussions. Preferably, messages automatically record user name, date and time.

Site Management Tools 225 include Site. Maintenance 540 to manage Project Information by allowing users of the project update their communications work environment and global settings. It also lets the projects managers update the content of the Web sites by supporting dynamic Text. This may be assisted by Document Library 515, an Image Library, a Project Showcase Tutorial 597, Project Directory 525, an event Calendar 510, and Internal Maintenance.

Site Management Tools 225 also include Web Trends Reports 555, and public comments 545, Public may comment on projects that have been already added by filling out a registration form to both authenticate and generate a report in accordance with various requirements. Projects may be searched by city, state and zip. Public Comment Reports 550 aggregate and combine the comments retrieved from one or more Web sites, for instance by date.

Survey Maintenance 560 in Site Management Tools 225 helps in building surveys having multiple formats such as requesting a respondent to Select All That Apply, respond with Yes/No, select one of multiple choices, rate (for instance on a scale from 1 to 5), select a range (for instance, between 1 to 5 to weigh against multiple options), or express agreement (such as Somewhat Agree to Completely Agrees). Survey questions may be preordered, shuffled, or be presented depending on one or more prior responses.

Survey Reports 565 present survey results, for instance as graphs, bar charts, and the like. These may be based on responses as a fraction of total responses received for a particular question. Some questions may be to calibrate the survey, ensure a particular sampling strategy, or detect inconsistencies.

In a preferred embodiment of the invention, the system setup procedures require that a Project Setup area be setup before using any other feature in the communications manager. This requires that the details for a client such as Client Name, Address etc be specified. For a many client entities, divisions should be created to categorize the projects across various divisions for better understanding. Following setting up of client and Division information, a Project Name and Number is assigned with automatic, through code, creation of new directories for the Client, Division and Project related data, setting up of Database tables for some default settings for the communications manager for a first use, setting up of custom logos and screens, including those that provide the same type of look and feel for several projects, and creation of mailing lists are created for the "Team Email" module.

Next, new users are set up and assigned to the project with an "access level." Once some users are added to the system, the modules they are allowed to see are also reflected in, preferably, setting up a menu resulting in customization of the navigation structure.

The public Web Site is setup through an automated system residing in communications manager, Site Maintenance 540. From this area a number of dynamic pages can be generated and controlled such that pages on the Web site can chose to have a special look and feel. Some distinctive features of this area include that dynamic data is stored in the RDBMS SQL server tables, there is no limit in principle on the number of pages that can be created/maintained, with, preferably, the same Asp files responsible for creating these dynamic pages.

Creation and setup of a whole project is very quick due to various features such as the database uses normalization resulting in interrelating the tables in the system to help the code to flexibly manipulate the data. Further, dynamic pages may be created by taking the existing look and feel from a site and provide new content on the fly. Adding and maintaining a new page is aided by the code using RDBMS and ASP. Some examples are:

EXAMPLE 1

Communications manager creates dynamic pages with each page identified by a Unique number that identifies the Page Name, Page Header and Page content. ASP code behind this logic uses SQL server, Identity columns and Primary key features to implement this logic.

EXAMPLE 2

The database of the communications manager is set up so that each table in the database is can be tracked back to one core table. Thus, every piece of information about every site is directly or indirectly related to this table.

EXAMPLE 3

Various security groups can be created and users with different access levels can be assigned to them. Thus, upon logging into the system, a user's Username and Password are sent to the SQL Server database for authentication and retrieving group properties. These properties control what is the user allowed to see without requiring different tables and code for each user having different rights and across multiple projects.

The interfaces and software can be realized using a variety of programming tools such as the J2EE suite, SQL server based databases, web-browsers such as Internet Explorer and the like. These are intended to be illustrative examples and should not be interpreted to be limitations on the scope of the invention described by the appended claims.

Figure 4:
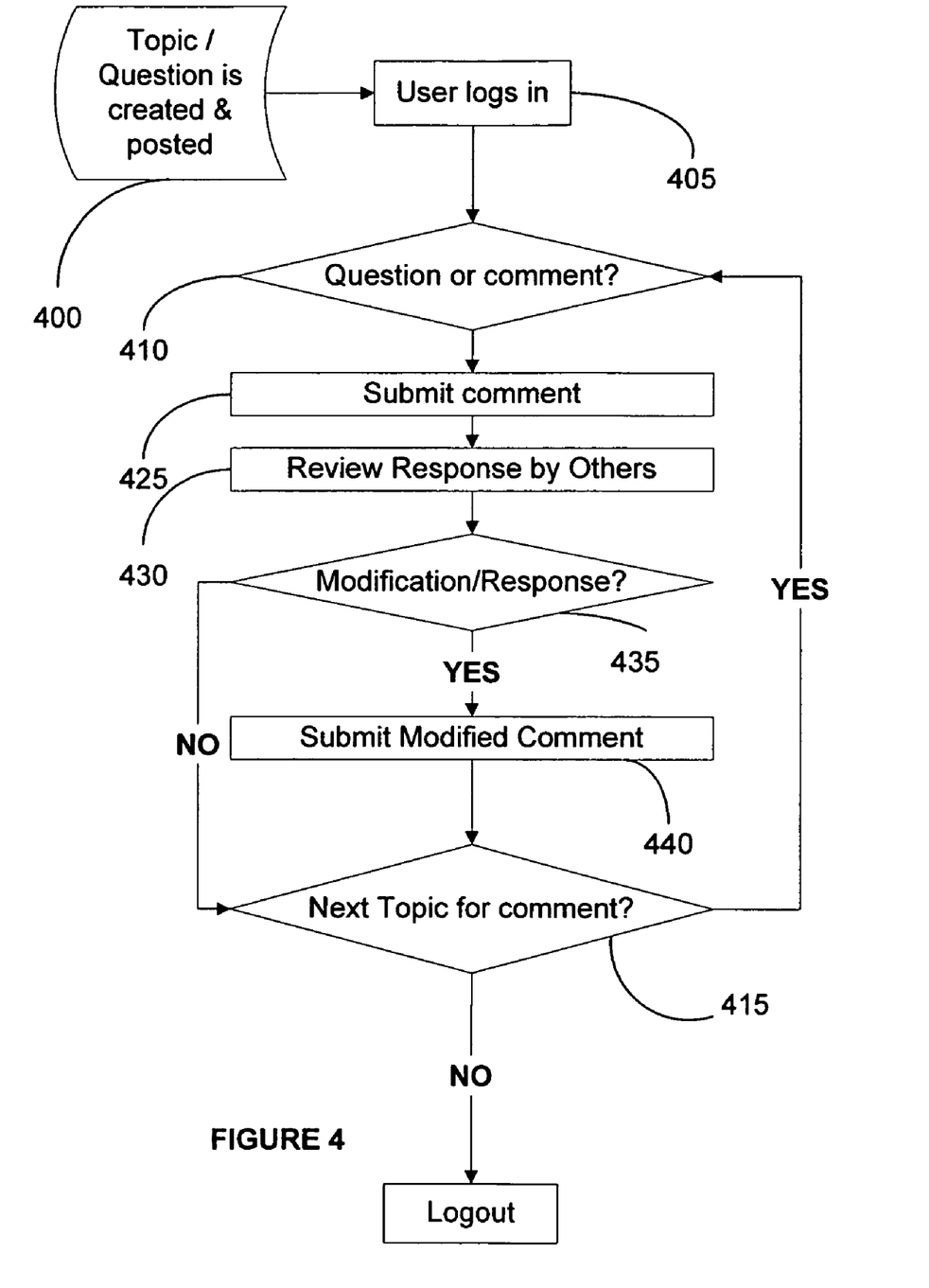
FIG. 4 schematically depicts a method for submitting comments at a Web site.

FIG. 4 presents a possible method for submitting comments in an embodiment of the invention. The submitted comment is modified in response to additional information, including possible submissions by other individuals. In a preferred embodiment, although anonymous comments are typically not allowed, it is also not customary to publish a comment online without prior permission of the comment submitter. This permission may be obtained for each comment or as a threshold condition for accessing the Web site and submitting comments.

Briefly, a topic or question is posted on a Web site during step 400. A user logs in during step 405 and decides whether to respond to the posted information during step 410. If the user decides to not post a comment, the user considers if another topic or issue is to be addressed during step 415. If no additional topics or issues are to be addressed, then the user logs off or the system may automatically logoff the user following a predetermined time period during step 420.

If on the other hand, the user decides to submit a comment during step 410, then control flows to step 425, during which the user composes and submits a comment. The user may further review responses by others to his or her comment or merely browse through posted comments during step 430. If the user decides that the previously submitted comment does no need to be modified during step 435, then control again flows to step 415 to determine whether additional comments are to be presented. Otherwise, control flows from step 435 to step 440, during which the user modifies the previously submitted comment. In an embodiment of the invention, the new comment preferably refers to the prior comment submission(s), although this is not a requirement for practicing the invention. Thus, in general, a user may view and receive information from a Web site in accordance with the invention. In addition, the user may submit one or more comments including comments that modify prior comments.

Figure 6:
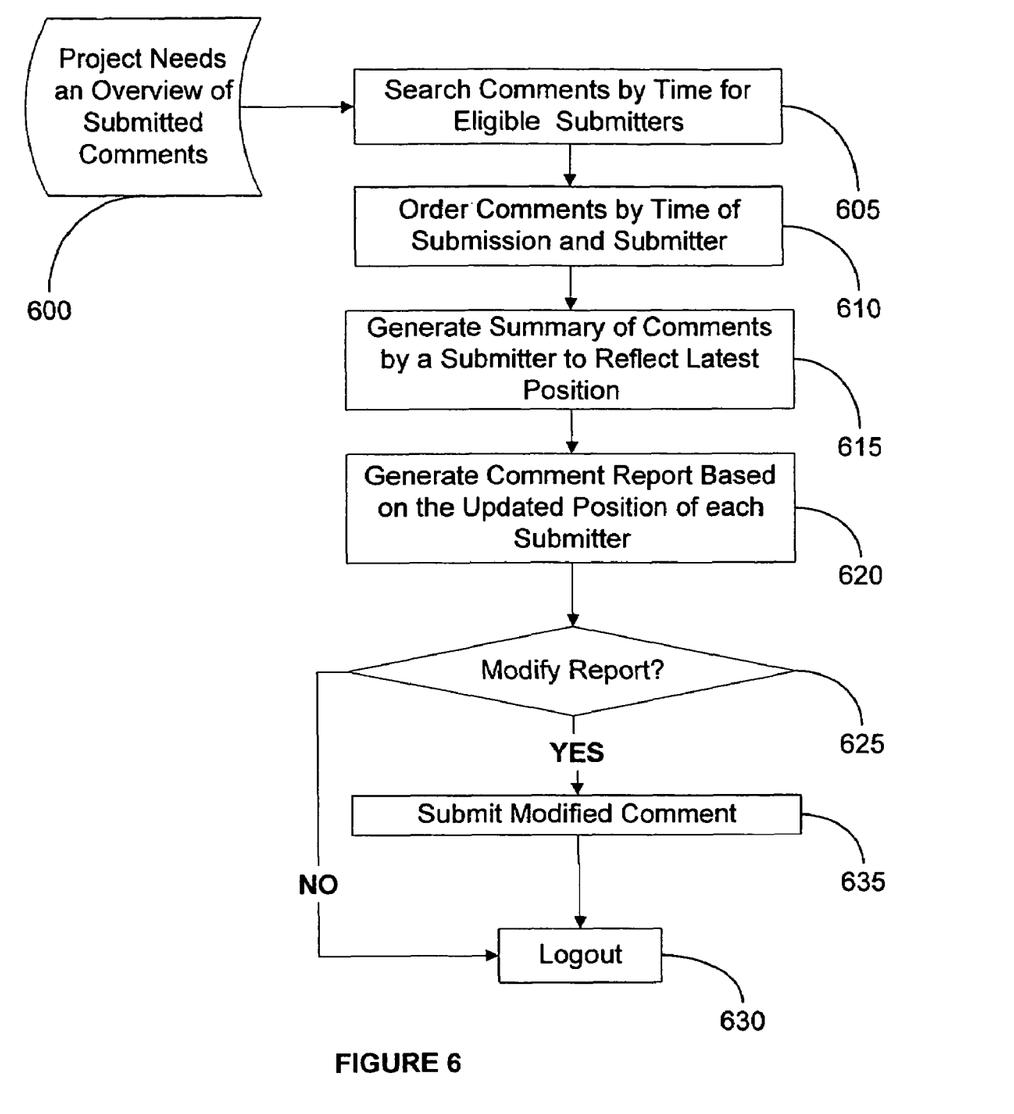
FIG. 6 illustrates a method for acting on submitted comments by identifying and using updated comments.
Figure 8:
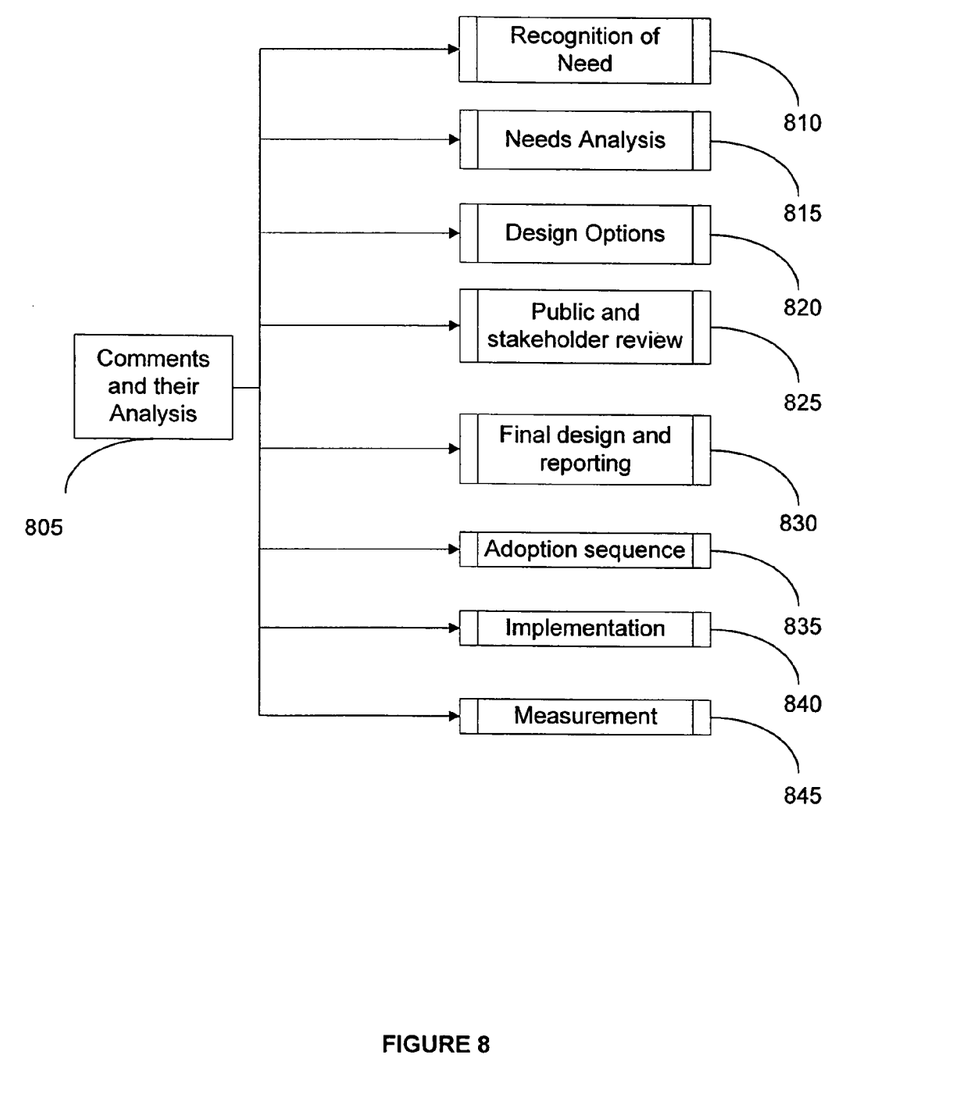
FIG. 8 schematically depicts the relationship comments, their analysis, and their use by Web sites.

FIG. 6 presents a method for using comment submitted in accordance with the method illustrated in FIG. 4. This method uses the back end integration to search through submissions to locate and order prior submissions for determining the outcome of all recorded submissions in a general report. As is known to one of ordinary skill in the art, submissions are used to typically gauge interest in a proposed regulatory rule or decision, or a particular topic as is depicted in FIG. 8. The submissions 805 in FIG. 8 are directed to recognizing a need 810, carrying out a needs analysis 815, review options, such as those for selecting a design 820, preparing and making a review directed to public or stakeholders 830, deciding on a final design, set in motion the adoption sequence 835, actual implementation of a proposal 840, and measuring public sentiments 845. Suitable summaries and response driven menus can obtain such input.

Returning to FIG. 6, during step 600 a decision is made to obtain an overview of the submissions till a particular date leading to a search of submitted comments by time for eligible submitters during step 605. Thus, if a submitter is not eligible to participate in a survey, then the submitter is not allowed to submit comments or the submitted comments are not included in analysis of the comments to prepare a report. During step 610, the comments are ordered, for instance by time of submission and submitter identifier name. A summary of some of the prior submissions by a particular submitter is created to reflect the current position as revealed by the various submissions. During step 625 a comprehensive report is generated based on the updated comments from each submitters. If during step 630 there is no need to modify the already submitted comment then the method terminates. Else, during step 635 a modified comment is submitted.

Figure 7:
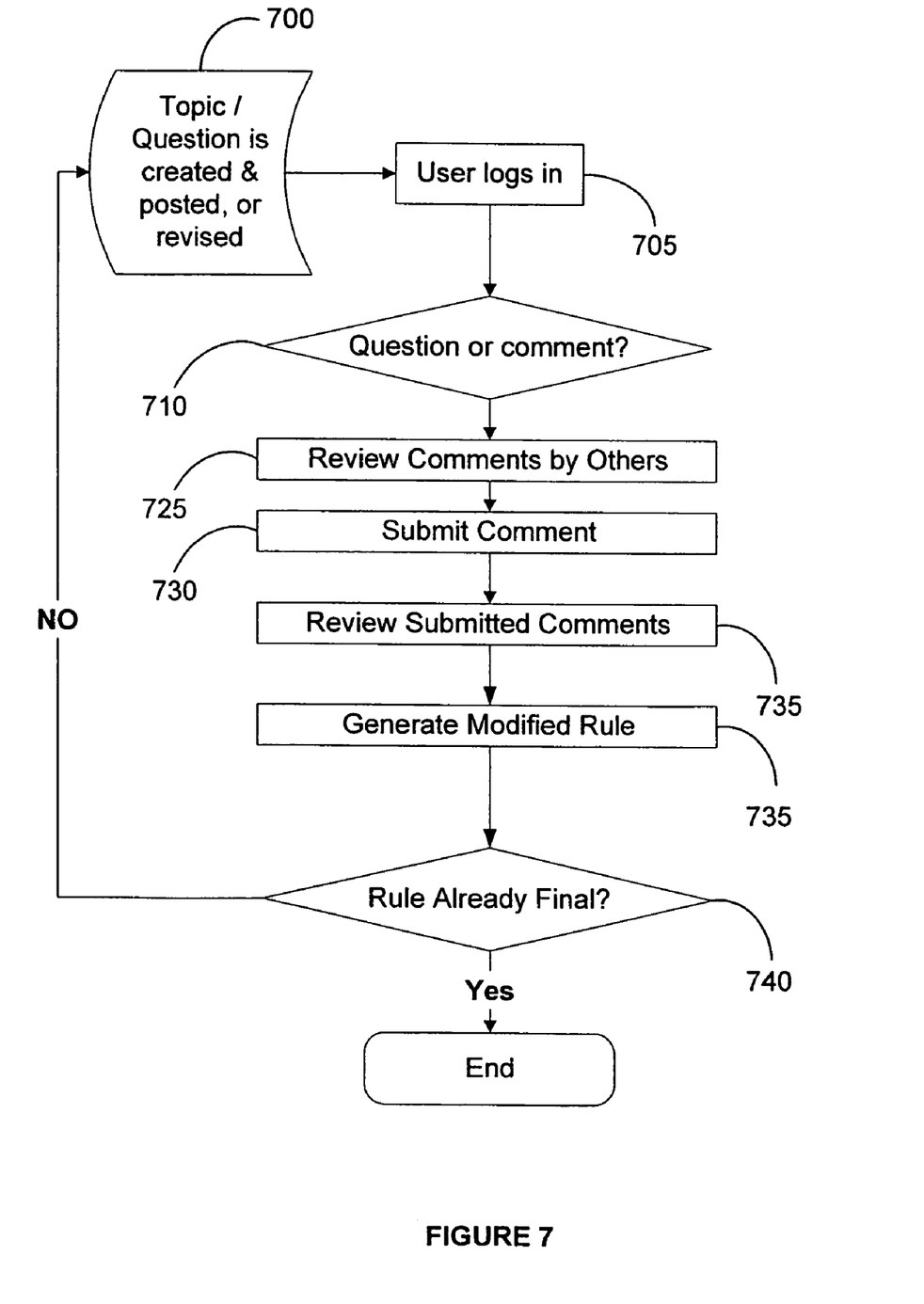
FIG. 7 illustrates a method for multiple rounds of proposed rules and revisions thereto in response to comments.

FIG. 7 depicts a possible feedback loop that shows changes in response to public comments posted and reviewed in substantially real time. While steps 700 to 710 correspond to steps 400 to 410 of FIG. 4 respectively, other steps differ in allowing both a review of others comments and modification of the topic, such as proposed rule, that lead to the comments in the first place. If the user wishes to submit one or more comments during step 710, then control passes to step 725, during which the submitter may review submissions by others. In the event the submitter is making comments, control shifts to step 735 for submitting one or more comments. Next, in view of the posted response of others reviewed during step 725, the user, in step 730, submits a comment. During step 735 a project team reviews the submitted comments and during step 740 generates a modified rule. If the modified rule is not final, then it is posted during step 700 to invite further comments. Else the method terminates.

The foregoing description of the preferred embodiments of the present invention has been presented for purposes of illustration and description. It is not intended to be exhaustive nor to limit the invention to the precise embodiments disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

What is claimed is:

1. A communications management network system for managing a public involvement project with a front end including a concurrent public feedback loop, the system comprising:
    a server computer connected to a network;
    a front end secure web portal to remotely access the server computer over the network for providing information regarding the public involvement project to public users at public-at-large and receiving a large number of public comment inputs regarding the public involvement project from the public users at the public-at-large;
    a backend for project team members managing the public involvement project to access the server computer, wherein the backend includes an integration and collaboration of public feedback and the backend is suitable for managing one or more public involvement projects;
    a communications manager application for receiving the large number of public comment inputs from the public users at the public-at-large and handling the large number of public comment inputs from the public users at the public-at-large for access by the project team members to use and respond to the large number of public comment inputs from the public users at the public-at-large regarding the public involvement project, wherein the communications manager application comprises:
    an information module for welcoming a user and referencing permission level access, wherein the information module further comprises a project overview, project news and project status;
    a project team tools module for coordinating and informing team members, wherein the project team tools module further comprises a task manager, calendar, team access management, team communications and image manager, and
    a communications tools module for facilitating information transfer, wherein the communications tools module further comprises one or more message boards and web conferencing;
    wherein the communications manager application further supports Web site maintenance by one or more of updating dynamic text areas, creating Web sites by using templates, handling multiple Web sites by using customizations of at least one shared feature, providing a separate address linked to a Web site for accepting the large number of public comment inputs, providing a separate address for accepting comments, providing automatic font and color adjustments, and supporting substantially unlimited number of active pages;

wherein the server computer provides access, following authentication, by the public users and the project team members to one or more of the information module, the project team tools module, the communications tools module, a site management tools module, and modules for:

searching the large number of public comment inputs;
organizing the large number of public comment inputs;
analyzing public comment inputs at the backend;
publishing the analyzed public comment inputs from the backend to enable the concurrent public feedback loop;
generating one or more reports by integrating the large number of public comment inputs or large number of searched public comment inputs; and
creating a modified rule based upon the analyzing and handling the large number of public comment inputs regarding the public involvement project, if the modified rule is not final, then questions are posted to invite further comments.

2. The system of claim 1, wherein the information module provides one or more of project overview, recent project changes, and project status.

3. The system of claim 1, further comprising at least one software interface for receiving the large number of public comment inputs.

4. The system of claim 3, wherein the at least one software interface comprises:
a first sub-interface for creating and submitting authenticating an individual selected from the public users from the public-at-large; and
a second sub-interface for receiving information about the individual selected from the public users from the public-at-large.

5. The system of claim 4, wherein the first and second interfaces are presented to the individual selected from the public users from the public-at-large in a seamless manner.

6. The system of claim 1, wherein the project team tools module provides one or more of a task manager, related links, a project calendar, an image manager, a document library, a project showcase, a directory, a listing of team members, and electronic communications with team members.

7. The system of claim 1, wherein the communications tools module provides one or more of web conferencing and message board.

8. The system of claim 1, wherein the site management tools module provides one or more of site maintenance, survey maintenance, web trend tools, survey reports, public comment and public comment reports.

9. The system of claim 1, wherein the backend further comprises:
an option for uploading documents,
an option for one or more of sorting and searching the large number of public comment inputs and documents in accordance with a specified search criteria; and
an option for filtering the large number of public comment inputs and documents.

10. The system of claim 1, wherein the site management tools module includes screening public submission to identify presence of inappropriate subject matter.

11. The system of claim 10, wherein the identified presence of inappropriate subject matter is sequestered for detailed review.

12. The system of claim 1, wherein the project team tools module includes searching for public submissions in accordance with one or more of a keyword, a time of submission, an identifier, an idea, a theme and a vision.

13. The system of claim 1, wherein the communications manager application further comprises:
shared modular code; and
means for responding to different browser implementations by invoking corresponding code.

14. The system of claim 1, wherein work product is published on a Website concurrently with a generation to invite comments to complete a feedback loop.

15. The system of claim 1, wherein the communications manager application accepts one or more of a public agency, a quasi public agency and an enterprise to manage the large number of public comment inputs, manage comments from a select audience, support one or more teams of consultants, agency staff, stakeholder organizations relevant to one or more public involvement projects at a same time.

16. The system of claim 1, wherein the communications manager application provides one or more of a public agency, a quasi public agency, an enterprise electronic project management with work-flow, document and image management, content management, Web-site management, and reporting technologies.

17. The system of claim 1, wherein access is provided to one or more of the information module, the project team tools module, the communications tools module, and the site management tools module at a plurality of levels.

18. The system of claim 17, wherein the plurality of access levels include User Manager for adding and assigning users to projects, Project Manager for creating new projects and having full access to a communications management module, and Team Member for having access to a limited number of modules with read/update privileges.

19. The system of claim 1, further comprising a public website maintenance interface for providing access to one or more of a project overview, a timeline, a document repository, an events calendar, an image manager, a public comment manager module, and a survey module.

20. The system of claim 19, wherein the communications manager application access the public website maintenance interface via a project site maintenance interface.

21. The system of claim 19, wherein the public comment manager module includes providing a submitter with one or more of an option of being notified of additional developments and participating in at least one survey.

22. The system of claim 1 further comprising modules for one or more of general information about a project, project goals, a project team, public documents, public notices, an image resource library, a project calendar, a project showcase, and a public comment module with one or more of a notification and survey functionality.

23. A computer-implemented method of managing a public involvement project with a front end including a concurrent public feedback loop and a backend including an integration and collaboration of public feedback, the method comprising:
providing access over a network, via a front end secure web portal, to a server computer operatively connected to the network;
providing information regarding the public involvement project to public users at public-at-large and receiving a large number of public comment inputs regarding the public involvement project from the public users at the public-at-large;
managing, by project team members, via the backend, the public involvement project to access the server computer, wherein the backend is suitable for managing one or more public involvement projects;

receiving, via a communications manager application, the large number of public comment inputs regarding the public involvement project from the public users at the public-at-large, handling the large number of public comment inputs from the public users at the public-at-large, wherein the handling includes responding, by the project team members, to the large number of public comment inputs from the public users at the public-at-large regarding the public involvement project;

searching the large number of public comment inputs;

organizing the large number of public comment inputs;

analyzing public comment inputs at the backend;

publishing the analyzed public comment inputs from the backend to enable the concurrent public feedback loop;

generating one or more reports by integrating the large number of public comment inputs or large number of searched public comment inputs;

creating a modified rule based upon the analyzing and handling the large number of public comment input regarding the public involvement project, if the modified rule is not final, then questions are posted to invite further comments;

wherein the generating, analyzing, publishing and the creating are executed by using the communications manager application, wherein the communications manager application comprises:

an information module for welcoming a user and referencing permission level access, wherein the information module further comprises a project overview, project news and project status, a project team tools module for coordinating and informing team members, wherein the project team tools module further comprises a task manager, calendar, team access management, team communications and image manager, and a communications tools module for facilitating information transfer, wherein the communications tools module further comprises one or more message boards and web conferencing;

wherein the communications manager application further supports Web site maintenance by one or more of updating dynamic text areas, creating Web sites by using templates, handling multiple Web sites by using customizations of at least one shared feature, providing a separate address linked to a Web site for accepting the large number of public comment inputs, providing a separate address for accepting comments, providing automatic font and color adjustments, and supporting substantially unlimited number of active pages;

accessing, following authentication, by the public users and the project team members, to the information module, the project team tools module, the communications tools module, and a site management tools module.

24. The method of claim 23, further comprising generating a modified proposal based upon reviewing and handling the large number of public comment inputs regarding the public involvement project.

25. The method of claim 24, further comprising recreating, reposting or revising the public involvement project.

26. The method of claim 23, wherein the information module further comprises a project overview, recent project changes, and project status.

27. The method of claim 23, wherein the project team tools module further comprises a task manager, related links, a project calendar, an image manager, a document library, a project showcase, a directory, a listing of team members, and electronic communications with team members.

28. The method of claim 23, wherein the communications tools module further comprises web conferencing and one or more message boards.

29. The method of claim 23, wherein the site management tools module further comprises site maintenance, survey maintenance, web trend tools, survey reports, public comment and public comment reports.

\* \* \* \* \*